United States Patent [19]
Lewis et al.

[11] Patent Number: 5,918,913
[45] Date of Patent: Jul. 6, 1999

[54] QUICK-CONNECT COUPLING FOR ARTICULATING HOSE LINES

[75] Inventors: Edward Clay Lewis; Darwin Olson, both of Franklin, Tenn.

[73] Assignee: Dana Corporation, Toledo, Ohio

[21] Appl. No.: 08/961,095

[22] Filed: Oct. 30, 1997

[51] Int. Cl.⁶ ..................................................... F16L 37/08
[52] U.S. Cl. .................... 285/148.14; 285/239; 285/330; 285/322
[58] Field of Search ......................... 285/148.13, 148.14, 285/148.15, 148.16, 148.17, 148.18, 239, 243, 308, 322, 323, 330

[56] References Cited

U.S. PATENT DOCUMENTS

| | | | |
|---|---|---|---|
| 3,314,696 | 4/1967 | Ferguson et al. ................... | 285/148.14 |
| 3,984,133 | 10/1976 | Bird ........................................ | 285/322 |
| 4,685,706 | 8/1987 | Kowal et al. ............................ | 285/322 |
| 4,905,766 | 3/1990 | Dietz et al. . | |
| 4,941,689 | 7/1990 | Sjoberg ............................... | 285/148.13 |
| 4,958,858 | 9/1990 | Guest ....................................... | 285/322 |
| 5,226,682 | 7/1993 | Marrison et al. ........................ | 285/308 |
| 5,284,369 | 2/1994 | Kitamura . | |
| 5,395,139 | 3/1995 | Morrisson . | |
| 5,505,501 | 4/1996 | Seabra ..................................... | 285/322 |
| 5,762,380 | 6/1998 | Hiwatashi et al. ...................... | 285/322 |

*Primary Examiner*—Eric K. Nicholson
*Attorney, Agent, or Firm*—Millen, White, Zelano, & Branigan, P.C.

[57] ABSTRACT

A quick-connect coupling for articulating hose lines includes a coupling body having a bore therein which receives a stem attached to a hose to be coupled to the body. A spline is positioned within the bore which receives a spline on the stem so that the stem does not rotate with respect to the bore and coupling body. A collet is provided which has inwardly and outwardly projecting detents that simultaneously engage both a shoulder within the bore and a groove in the stem to prevent axial movement of the stem with respect to the bore. While the stem is thus retained within the bore, an O-ring seals with the surface of the stem. In order to disconnect the stem from the bore, a collet is pressed inwardly to disengage the detents and then the stem is pulled axially away from the coupling member. By providing a quick-connect coupling in which a stem does not rotate with respect to a coupling member, the collet which is used to lock or latch the stem and coupling member axially to one another is not worn and stressed by relative rotation between the stem and coupling member so as to threaten the integrity of the coupling.

17 Claims, 1 Drawing Sheet

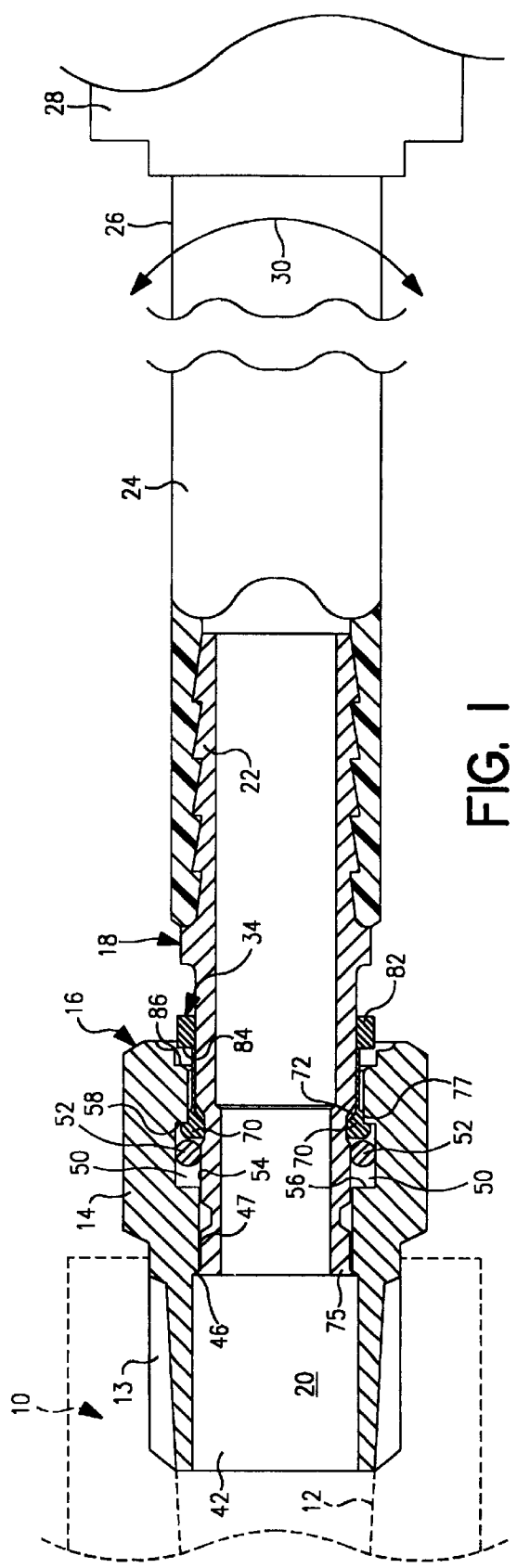
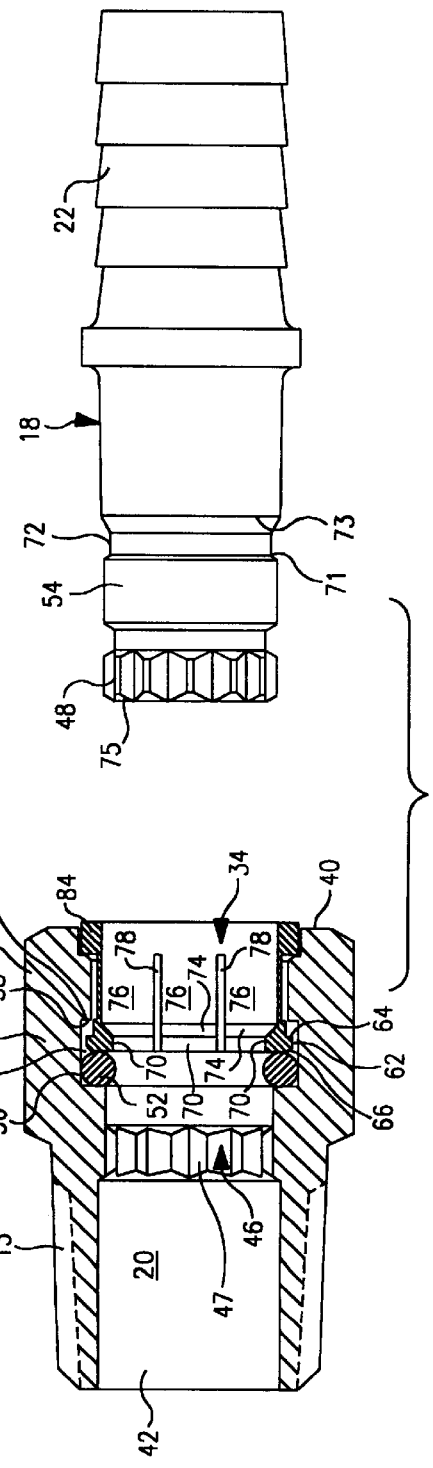
FIG. 1
FIG. 2

5,918,913

QUICK-CONNECT COUPLING FOR ARTICULATING HOSE LINES

FIELD OF THE INVENTION

This invention relates to quick-connect couplings for articulating hose lines, a more particularly, this invention relates to quick-connect couplings which stabilize articulating hose lines.

BACKGROUND OF THE INVENTION

Pneumatic devices, such as air brakes, are widely used in the automotive industry. Typically, compressed air stored in tanks is applied to airbrake operating mechanisms through flexible hoses which have couplings at both ends. Typically, the hose is a reinforced hose which is attached to a first end to a fixed quick-connect or push-to-connect coupling and at a second end to a rotary coupling. On a moving vehicle, when the rotary coupling moves with respect to the fixed coupling, the hose tends to twist. If the fixed coupling is a push-to-connect quick-connect coupling with a collet, there is a tendency for the coupling to rapidly degrade, wear out and fail. This is because the collet cannot long tolerate rotary motion of a rigid tube received therein to which the first end of the reinforced hose is fixed.

Quick-connect couplings are now highly desirable because they are less expensive than other types of couplings, are reliable and make quick connections. In situations where reinforced hoses are subjected to torsional loads, the advantage of quick-connect couplings have not been available because the couplings tend to fail. This failure is primarily due to rotational stresses applied to collets used with quick-connect couplings.

SUMMARY OF THE INVENTION

In view of the aforementioned considerations, it is a feature of the present invention to provide an improved quick-connect coupling permitting quick-connect couplings to be used with reinforced hoses subjected to torsional loads.

The present invention is directed to a quick-connect coupling for coupling a to a device wherein the coupling comprises a body, a resilient seal, a collet and a stem which is fixed to the hose. The body has a bore therethrough which communicates with a first end opening of the body. The bore has a non-circular portion, an annular cavity and at least one radially extending shoulder. The seal is received in the annular cavity of the bore for sealing with the stem and a collet is received in the bore for locking the stem within the bore. The collet has at least one outwardly extending detent which is received behind a radially extending shoulder in the bore and at least one inwardly extending detent. The stem includes a non-circular surface for mating with the non-circular portion of the bore in order to prevent the stem from rotating with respect to the body and a shoulder which is engageable by the inwardly extending detent of the collet to retain the stem within the bore.

In a more specific aspect, the non-circular surface of the stem and the non-circular portion in the bore are defined by projecting members having radially extending surfaces which abut one another to prevent rotation of the stem within the bore.

In another aspect of the invention, the seal is an O-ring and the cavity which receives the seal has an axial length greater than the seal and is defined at one end by the radially extending shoulder of the bore of the body. The collet has an outwardly extending detent which is received in the annular cavity and engages the radially extending shoulder when locking the stem within the bore. By using this configuration, a stem can be uncoupled from the body by pressing the collet inwardly and then pulling the stem out of the bore by pulling the hose away from the body.

BRIEF DESCRIPTION OF THE DRAWINGS

Various other features and attendant advantages of the present invention will be more fully appreciated as the same becomes better understood when considered in conjunction with the accompanying drawings, in which like reference characters designate the same or similar parts throughout the several views, and wherein:

FIG. 1 is a side view with most portions in elevation, illustrating a rigid tube used to secure a reinforced hose to a quick-connect coupling, wherein the quick-connect coupling is configured in accordance with the principles of the present invention; and FIG. 2 is an exploded side view showing quick-connect coupling of FIG. 1 disconnected.

DETAILED DESCRIPTION

Referring now to FIG. 1, there is shown, in dotted lines, an airbrake chamber 10 used in an airbrake (not shown). The airbrake chamber 10 has a bore 12 in a wall throughout to which is threadably connected by threaded end 13, a coupling body 14 of a quick-connect coupling 16, configured in accordance with the principles of the present invention. The quick-connect coupling 16 includes a stem 18 which is received in a bore 20 in the coupling body 14. Crimped to a crimp style hose nipple 22 of the stem 18 is a reinforced hose 24. The reinforced hose 24 has an end 26 distal of the quick-connect coupling 16 attached to a rotatable coupling 28. When the rotatable coupling 28 moves, a torsional force illustrated by the arrows 30 is applied through the hose 24 to the quick-connect coupling 16. If the stem 18 of the quick-connect coupling 16 is allowed to rotate within the bore 20 of the coupling body 14, the quick-connect coupling 16 may fail due to failure of a collet 34 which is used to releasably secure the stem 18 within the bore 20.

An airbrake chamber 10 into which the threaded end 13 of the coupling body 14 is received illustrates one use of the coupling 16. Instead of the airbrake chamber 10, the body 14 may be attached to a frame, rail or a valve and the connection thereto may be instead of the threaded connection by threads 15, a pipe, an O-ring boss, a bulkhead or any other common plumbing connection. The connection may also be a special press fit configuration used to connect a molded straight bore or to connect a plastic valve body to a hose or tube. While a general rotatable coupling 28 is shown, the end 26 of the hose 25 may be connected by another quick-connect coupling, or any other type of coupling.

Referring now mainly to FIG. 2, in conjunction with FIG. 1, a bore 20 of the body 14 has a first end opening 40 and a second opening 42. The second end opening 42 is surrounded by the threads of the threaded end 13 and communicates in the illustration with the airbrake chamber 10. The first end opening 40 and second end opening 42 are connected by bore 20, the bore 20 having a series of internally facing structural features which cooperate to retain the stem 18 therewithin.

Within the body 14, there is an annular spline 46 which provides a non-circular portion of the body 20 with inwardly facing projections or polygons having radially extending surfaces 47. The spline 46 meshes with a spline 48 from the stem 18, which spline 48 provides a non-circular area on the stem 18 comprised of outwardly extending projections having generally radially extending surfaces 49. Since the generally radially extending surfaces 49 engage the generally radially extending surfaces 47, the stem 18 cannot rotate within the body 14 once it is shoved home to the position shown in FIG. 1.

In order to limit axial movement of the stem 18 into the bore 20 of the coupling body 14 and in order to seal the stem with respect to the coupling body, an annular groove 50 with a dual function is provided in the bore 20. The annular groove 50 has an O-ring 52 therein which engages a cylindrical land 54 on the stem 18, which cylindrical land 54 has an axial extent sufficient to maintain the seal, even if there is axial movement of the stem 18.

The axial groove 50 is defined by a first end shoulder 56 and a second end shoulder 58, wherein the first end shoulder 56 serves as a stop for the O-ring seal 52 when the inner end 60 of the collet 34 presses the O-ring seal thereagainst upon insertion of a stem 18. As is seen in FIG. 1, the second shoulder 58 serves as an axial stop and positioner for the collet 34. The second shoulder 58 cooperates with the inner end 60 of the collet 34 by receiving a plurality of outwardly extending projections 62 on the collet, each of which have radially extending shoulders 64 that abut the shoulder 58 to prevent axial movement of the collet 34 out of the bore 20 when pulled. The outwardly projecting detents 62 each have a ramp 66 that cause the detents 62 to be deflected inwardly when the collet 34 is axially pushed into the bore 20. Opposite the outwardly extending detents 62 are inwardly extending detents 70 which engage in an annular groove 72 in stem 18, as is seen in FIG. 1. The annular groove 72 is defined by first and second shoulders 71 and 73, respectively. The inwardly extending detents 70 each have a beveled surface 74 thereon which are engaged by the beveled leading end 75 of the stem 18 in order to cam the outwardly extending detents 62 further into the annular groove 50 so that the splined end 48 and the cylindrical land 54 can clear the inwardly projecting detents 70 on the collet. The outwardly extending detents 62 and inwardly extending detents 70 are mounted on spring arms 76 of the detent 34, which spring arms are separated by slits 78.

The outer end 80 of the collet 34 includes a projecting rim 82 which has a shoulder 84. The shoulder 84 engages an annular shoulder 86 in the bore 20 when the collet 34 is pressed all the way in, as is shown in FIG. 2, so that the outwardly extending detent 62 is received in the annular groove 50.

Upon connecting the stem 18 to the coupling body 16, the stem 18 is pushed axially into the bore 20 so as to push the collet 34 and the O-ring 52 further into the bore 20 from perhaps the FIG. 1 position to the FIG. 2 position. Detents 62 are then cammed into the annular groove 50 so that the stem 18 slides past the collet 34 to engage the splines 48 on the stem with the splines 46 within the body 14. During assembly, it may be necessary to rotate the stem 18 slightly so that the spaces between the projections forming the splines line up, allowing the stem 18 to be pushed home to the FIG. 1 position. Upon pulling the stem 18 axially in a direction away from the coupling body 14, the beveled shoulders 73, which define one end of the groove 72 in the stem, engage the end 60 of the collet 34 and drag the collet back to the FIG. 1 position where the shoulders 64 on the outwardly extending projection 62 engage the shoulders 58 defining the annular groove 50. This causes the collet 34 to cease its axial slide and to tightly lock the stem 18 within the bore 20 because the detents 70 become firmly seated within the annular groove 72 of the stem.

In order to decouple the stem 18 from the coupling body 14, the collet 34 is pressed separately inward to the FIG. 2 position, so that the shoulder 84 on the collet rim 82 engages the shoulder 86 in the bore 20. This aligns the outwardly extending detents 62 with the annular groove 50 so as to clear the shoulder 58 of the annular groove. Stem 18 is then pulled out with the collet 34 pressed in (as in FIG. 2) and beveled shoulder 71 on the annular groove 72 cams the outwardly extending detents 62 into the annular groove 50 so that the stem 18 slips past the inwardly extending detents 70 and out of the bore 20.

Normally, if one attempts to press the stem 18 into the bore 20, the beveled shoulder 75 defining the front end of the groove 72 cams the annular surface 77 adjacent the shoulder 64 of the collet 34 outwardly. This extends detent 62 against the wall of the bore 20 preventing the collet 34 from moving axially, thus locking the collet 34 in the position of FIG. 1, so that the stem 18 cannot be withdrawn.

The aforedescribed structure provides a quick-connect coupling in which a stem, such as the stem 18 does not rotate within a coupling body 14. While the coupling 16 is of specific interest with respect to connecting airbrake hoses, it is to be understood that this coupling has other applications in related fields.

From the foregoing description, one skilled in the art can easily ascertain the essential characteristics of this invention and, without departing from the spirit and scope thereof, can make various changes and modifications of the invention to adapt it to various usages and conditions.

What is claimed is:

1. A quick-connect coupling for coupling a hose to a device:
   a body having a bore therethrough communicating with a first end opening, the bore having a non-circular portion, an annular cavity and at least one radially extending shoulder;
   a resilient seal received in the annular cavity;
   a collet received in the bore, the collet having at least one outwardly extending detent received behind the radially extending shoulder and at least one inwardly extending detent; and
   a stem having a first end receivable in the bore of the body and a second end for coupling with a hose, the first end of the stem having a non-circular surface complementing the non-circular portion in the bore of the body and being receivable therein for preventing the stem from rotating with respect to the body; a shoulder on the stem engageable by the inwardly extending detent of the collet to retain the stem within the bore of the body, and a surface on stem engageable by the seal in the annular cavity for sealing the stem with respect to the base of the body.

2. A quick-connect coupling according to claim 1, wherein the non-circular portion in the bore and the non-circular surface of the stem are defined by projecting members having radially extending surfaces which abut one with another.

3. A quick-connect coupling according to claim 2, wherein the surface on the stem engageable by the seal is disposed between the non-circular area of the stem and the shoulder on the stem, wherein the seal engages the stem between the non-circular area and the shoulder on the stem and the inwardly extending detent of the collet when the stem is retained in the bore of the body.

4. A quick-connect coupling according to claim 3, wherein the collet has a series of axially extending slits therein defining detent arms from which the outwardly and inwardly extending detents project.

5. A quick-connect coupling according to claim 4, wherein the collet includes an outwardly extending shoulder at the outer end thereof which engages the body to limit axial movement of the collet into the bore of the body.

6. A quick-connect coupling according to claim 5, wherein the annular cavity which receives the seal is defined at one end by the radially extending shoulder which is engageable by the collet.

7. A quick-connect coupling according to claim 6, wherein the annular cavity has an axial length substantially greater than the combined length of the axial thickness of the seal and the axial length of the outwardly projecting detent, whereby the detent disengages from the annular shoulder of the stem upon pressing the collet inwardly with respect to the bore.

8. A quick-connect coupling according to claim 7, wherein the seal is an O-ring.

9. A quick-connect coupling according to claim 1, wherein the seal is an O-ring.

10. A quick-connect coupling according to claim 1, wherein the non-circular portion and non-circular area are splined surfaces.

11. A quick-connect coupling according to claim 1, wherein the surface on the stem engageable by the seal is disposed between the non-circular area of the stem and the shoulder on the stem, wherein the seal engages the stem between the non-circular area and the shoulder on the stem and the inwardly extending detent of the collet when the stem is retained in the bore of the body.

12. A quick-connect coupling according to claim 1, wherein the collet, has a series of axially extending slits therein defining detent arms from which the outwardly and inwardly extending detents project.

13. A quick-connect coupling according to claim 1, wherein the collet includes an outwardly extending shoulder at the outer end thereof which engages the body to limit axial movement of the collet into the bore of the body.

14. A quick-connect coupling according to claim 1, wherein the annular cavity which receives the seal is defined at one end by the radially extending shoulder which is engageable by the collet.

15. A quick-connect coupling according to claim 1, wherein the annular cavity has an axial length substantially greater than the combined length of the axial thickness of the seal and the axial length of the outwardly projecting detent, whereby the detent disengages from the annular shoulder of the stem upon pressing the collet inwardly with respect to the bore.

16. The quick-connect coupling of claim 1, wherein the second end of the stem is configured with annular ribs for forming a crimped coupling with a hose.

17. The quick-connect coupling of claim 16, wherein the body has a second end which is threaded for threadably coupling with an airbrake chamber.

* * * * *